United States Patent
Umeda

(10) Patent No.: US 9,853,503 B2
(45) Date of Patent: Dec. 26, 2017

(54) WIRELESS POWER FEEDING SYSTEM

(71) Applicant: CANON KABUSHIKI KAISHA, Tokyo (JP)

(72) Inventor: Yoshinobu Umeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 375 days.

(21) Appl. No.: 14/595,973

(22) Filed: Jan. 13, 2015

(65) Prior Publication Data

US 2015/0200569 A1    Jul. 16, 2015

(30) Foreign Application Priority Data

Jan. 15, 2014    (JP) .................. 2014-005423

(51) Int. Cl.
| | | |
|---|---|---|
| H01F 27/42 | (2006.01) | |
| H01F 37/00 | (2006.01) | |
| H01F 38/00 | (2006.01) | |
| H02J 17/00 | (2006.01) | |
| H02J 50/40 | (2016.01) | |
| H02J 5/00 | (2016.01) | |

(52) U.S. Cl.
CPC .............. *H02J 17/00* (2013.01); *H02J 5/005* (2013.01); *H02J 50/40* (2016.02)

(58) Field of Classification Search
CPC .. H02J 50/40; H02J 17/00; H02J 5/005; H02J 7/025; H04B 5/0037; H01F 38/14
USPC ........................................................ 307/104
See application file for complete search history.

(56) References Cited

U.S. PATENT DOCUMENTS

2015/0035373 A1*   2/2015 Chen ................. H04B 5/0037
                                                   307/104

FOREIGN PATENT DOCUMENTS

JP    2009-136132 A    6/2009
JP    2011-211874 A    10/2011

* cited by examiner

*Primary Examiner* — Carlos Amaya
(74) *Attorney, Agent, or Firm* — Canon U.S.A., Inc. IP Division

(57) ABSTRACT

In a case where a power transmission device operating as a master disappears, a wireless power feeding system selects a power transmission device to operate as a master instead based on predetermined priority levels.

6 Claims, 13 Drawing Sheets

WIRELESS POWER FEEDING SYSTEM

BACKGROUND OF THE INVENTION

Field of the Invention

The present invention relates to a wireless power feeding system.

Description of the Related Art

A 1-to-N power feeding scheme has been proposed in which a power transmission device transmits power to a plurality of wireless power reception devices.

According to Japanese Patent Laid-Open No. 2009-136132, in a standby mode in which a power transmission device is not feeding power, a constant-pulse signal is sent to search whether a wireless power reception device is brought closer to the power transmission device within several meters. When a wireless power reception device sends its unique ID to a power transmission device, the power transmission device determines whether the wireless power reception device is a power feeding target or not. If it is a wireless power reception device to which power is to be fed, the power transmission device transmits power to the wireless power reception device. At the same time, in order to receive information such as a charged amount and a device state from the power transmission device, an inherent code may further be transmitted to the wireless power reception device.

Japanese Patent Laid-Open No. 2011-211874 proposes a technology in which a plurality of power transmission devices are combined to operate as one connected system.

SUMMARY OF THE INVENTION

In a wireless power feeding system having a plurality of power transmission devices, one of a plurality of power transmission devices operates as a master and controls operations of power transmission devices which operates as slaves. The present invention allows continued wireless power feeding to a power reception device even when a power transmission device which operates as a master disappears.

The present invention provides a wireless power feeding system having power transmission devices which may execute wireless power feeding to power reception devices, the system including a first selecting unit configured to select from a plurality of power transmission devices a power transmission device operating as a master which determines to which power reception devices other power transmission devices operating as slaves execute wireless power feeding, a setting unit configured to set priority levels for the power transmission devices operating as slaves in case of the power transmission device operating as the master disappears, a detecting unit configured to detect that the power transmission device operating as the master has disappeared, and a second selecting unit configured to select a power transmission device operating as a master based on the priority levels set by the setting unit in a case where the detecting unit detects that the power transmission device operating as the master has disappeared.

Further features of the present invention will become apparent from the following description of exemplary embodiments with reference to the attached drawings.

DESCRIPTION OF THE EMBODIMENTS

Embodiments of the present invention will be described below with reference to drawings.

Figure 1:
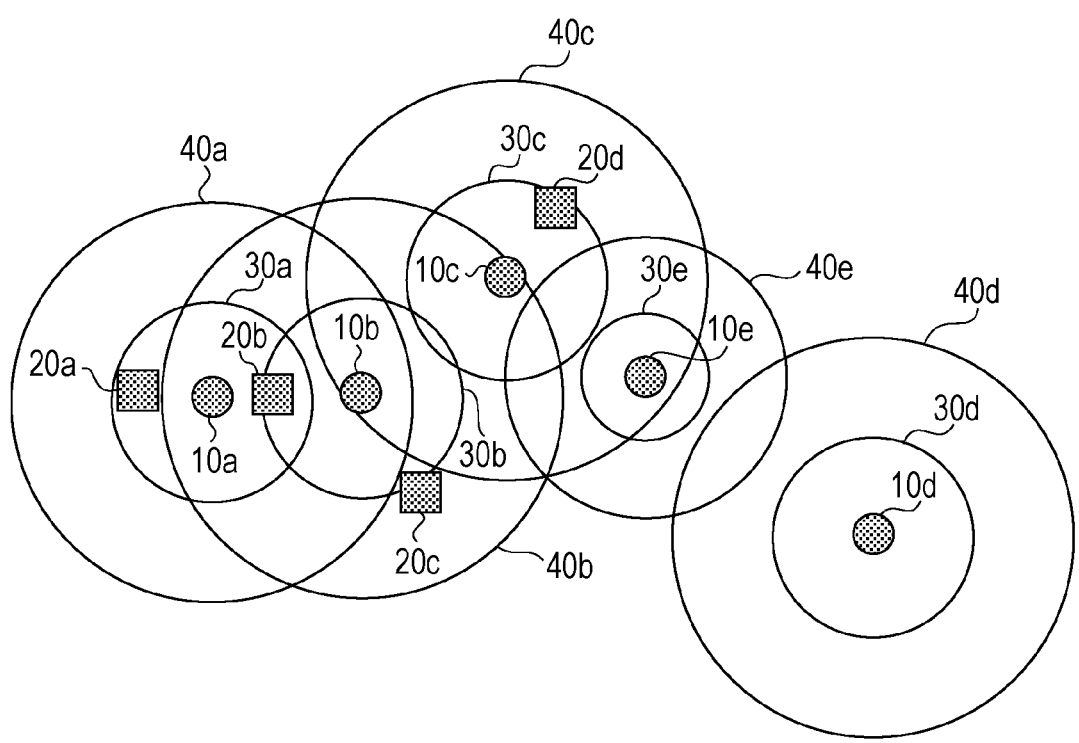
FIG. 1 illustrates an example of a system configuration of an N-to-N wireless power feeding system in which a plurality of power transmission devices transmit power to a plurality of power reception devices.

FIG. 1 illustrates an example of a system configuration of an N-to-N wireless power feeding system in which a plurality of power transmission devices transmit power to a plurality of power reception devices.

The power transmission devices 10a, 10b, 10c, 10d, and 10e feed power wirelessly to power reception devices 20a, 20b, 20c, and 20d. The power transmission devices 10a, 10b, 10c, 10d, and 10e perform data communication for the power feeding to the power reception devices 20a, 20b, 20c, and 20d within a communicable range.

The power reception devices 20a, 20b, 20c, and 20d receive power wirelessly from the power transmission devices 10a, 10b, and 10c. The power reception devices 20a, 20b, 20c, and 20d perform data communication for the power feeding from power transmission devices 10a, 10b, and 10c within a communicable range.

Power feeding areas 30a, 30b, 30c, 30d, and 30e represent areas in which power feeding is allowed from the power transmission devices 10a, 10b, 10c, 10d, and 10e to the power reception devices 20.

Communication areas 40a, 40b, 40c, 40d, and 40e represent areas in which the power transmission devices 10a, 10b, 10c, 10d, and 10e can perform data communication. The communication targets in this case are power transmission devices 10 and power reception devices 20.

Regarding the relationship between the power feeding area 30 and the communication area 40 of the power transmission device 10, the communication area 40 is larger than the power feeding area 30, and the communication area 40 contains the power feeding area 30.

In a case where a plurality of power transmission devices 10 exist in the communication area 40, like the power transmission devices 10a and 10b and power transmission devices 10b and 10c in FIG. 1, those power transmission devices 10 form a group in which one of the power transmission devices 10 operates as a master. The power transmission device operating as a master determines which power transmission device feeds power to power reception devices in their power feeding areas within the group.

Referring to FIG. 1, because the power transmission devices 10a and 10b and the power transmission devices 10b and 10c exist within their mutual communication areas 40, the three of the power transmission devices 10a, 10b and 10c form a group. Because the power transmission devices 10a and 10c do not exist within the mutual communication areas 40a and 40c, direct communication is not allowed from the power transmission device 10a to the power transmission device 10c or from the power transmission device 10c to the power transmission device 10a.

However, the power transmission device 10a and power transmission device 10c are indirectly communicable through the power transmission device 10b which can communicate with both of them. Thus, the power transmission devices 10a, 10b and 10c form a group.

On the other hand, because the power transmission device 10d does not have a communicable power transmission device within the communication area 40d, a group is not formed. Therefore, the power transmission device 10d performs a power transmission operation alone.

Though the power transmission device 10e is included in the communication area of the power transmission device 10c, the power transmission device 10e does not have a communicable power transmission device within the communication area 40e of the power transmission device 10e. Therefore, the power transmission device 10e performs a power transmission operation alone.

Figure 2:
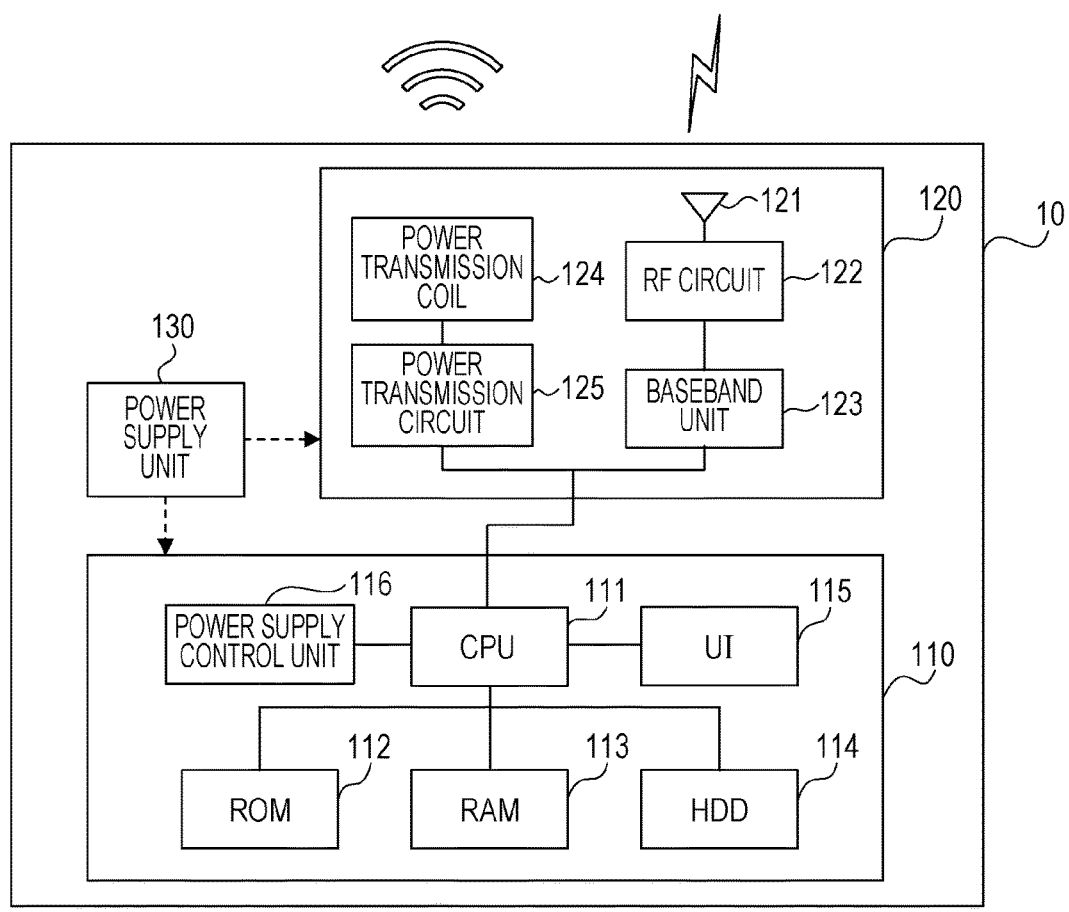
FIG. 2 illustrates an example of a hardware configuration of a power transmission device.

FIG. 2 illustrates an example of a hardware configuration of a power transmission device.

In FIG. 2, solid lines indicate data exchanges, and broken lines indicate power feeding.

The power transmission device 10 includes a control unit 110, a wireless communication unit 120, and a power feeding unit 130.

The control unit 110 includes a CPU 111, a ROM 112, a RAM 113, an HDD 114, a user interface (UI) 115, and a power feeding control unit 116. The control unit 110 is connected to the wireless communication unit 120 via an internal bus.

The CPU 111 transmits display data to the user interface 115 and performs data access to the ROM 112, RAM 113, and HDD 114. The CPU 111 is connected to the wireless communication unit 120 via an internal bus and performs wireless communication and controls the power transmitting circuit 125.

The ROM 112 is a non-volatile storage medium and may store a boot program to be used by the CPU 111, for example.

The RAM 113 is a volatile storage medium and temporarily stores data and programs to be used by the CPU 111 and exchange data which are information on the power transmission device 10 to be exchanged including a power feeding area, a communication area, and a maximum power transmission of the power transmission device. Hereinafter, such information will be called Info or Info information.

The HDD 114 is a non-volatile storage medium and may store an OS and an application program to be used by the CPU 111 and device information (a part of Info information) which is not rewritten.

The user interface 115 displays various kinds of information to a user and receives various instructions from a user.

The power feeding control unit 116 controls power feeding to blocks.

The wireless communication unit 120 communicates with the power transmission device 10 and the power reception device 20 and is configured to transmit power to the power reception device 20 wirelessly. The wireless communication unit 120 includes an antenna 121, an RF circuit 122, a baseband unit 123, a power transmission coil 124, and a power transmitting circuit 125.

The antenna 121 may receive convert electromagnetic waves to an electric signal or convert an electric signal to electromagnetic waves.

The RF circuit 122 modulates a baseband signal to a frequency band (RF band) for transmission. The RF circuit 122 demodulates a signal in a frequency band to a baseband signal for reception.

The baseband unit 123 receives electromagnetic waves from the antenna 121, performs AD conversion on them and processes the electric signal. The baseband unit 123 performs DA conversion on an electric signal from the CPU 111 and transmits the electromagnetic waves to the antenna 121.

The power transmitting circuit 125 generates a modulated signal for transmitting power.

The power transmission coil 124 transmits a signal modulated by the power transmitting circuit 125 to the power reception device 20 and a group of other power transmission devices.

The power feeding unit 130 converts AC voltage from an AC power feeding to direct-current voltage and supplies direct current voltage to the control unit 110 and the wireless communication unit 120.

The CPU 111 executes a process based on a program stored in the ROM 112 or the HDD 114 so that functions of a power transmission device and flow processing involving a power transmission device, which will be described below, may be implemented.

Figure 3:
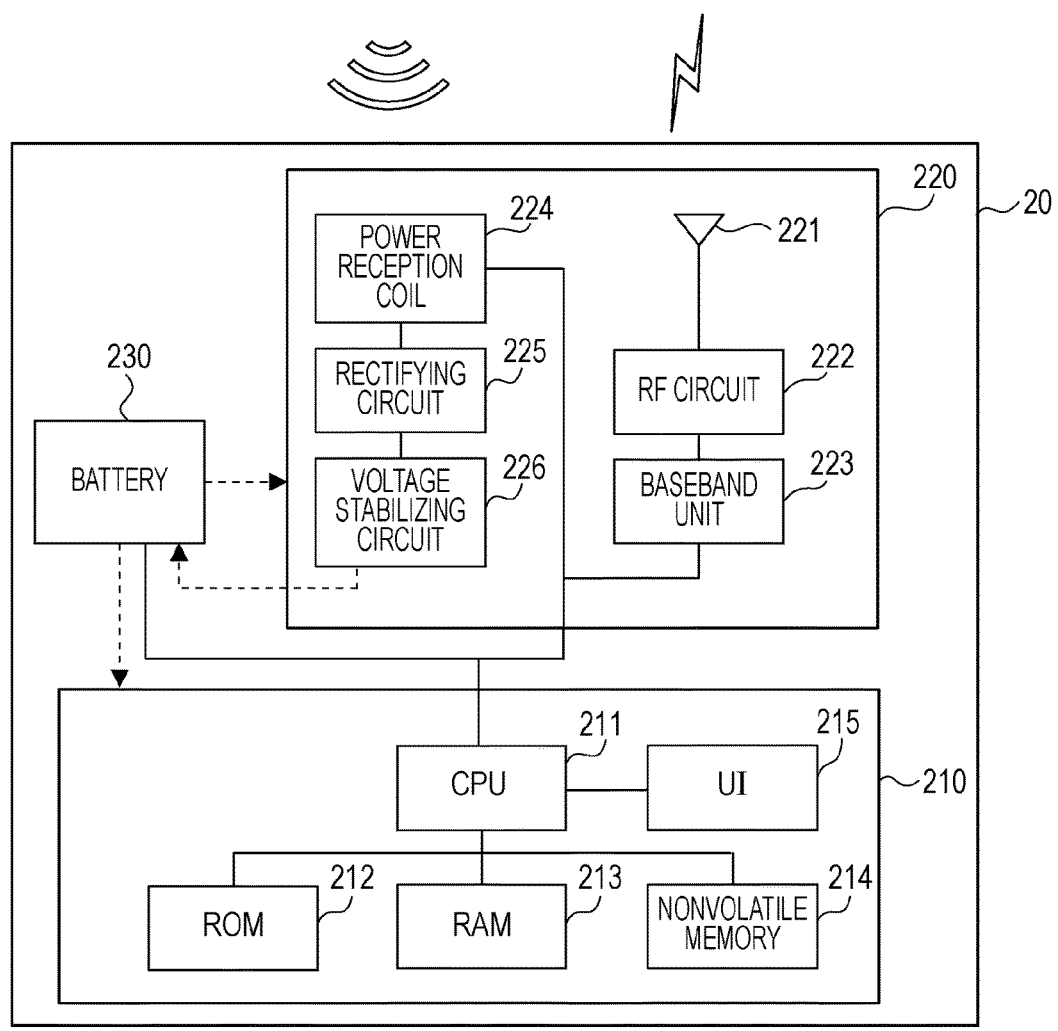
FIG. 3 illustrates an example of a hardware configuration of a power reception device.

FIG. 3 illustrates an example of a hardware configuration of a power reception device.

In FIG. 3, solid lines represent data communication, and broken lines represent power feeding.

The power reception device 20 includes a control unit 210, a wireless communication unit 220, and a battery 230.

The control unit 210 is configured to control the power reception device 20. The control unit 210 includes a CPU 211, a ROM 212, a RAM 213, a non-volatile memory 214, and a user interface (UI) 215. The control unit 210 is connected to a wireless communication unit 220 via an internal bus.

The CPU 211 performs data communication to the ROM 212, RAM 213, and non-volatile memory 214 and may transmit display data to the user interface 215. The CPU 211 is connected to the wireless communication unit 220 and the battery 230 via an internal bus and may perform control so as to stop charging to the power reception coil 224 when the battery 230 is fully charged, check the remaining amount of the battery 230 and control wireless communication.

The ROM 212 is a non-volatile storage medium and may store a boot program to be used by the CPU 211.

The RAM 213 is a volatile storage medium and may temporarily store data and a program to be used by the CPU 211.

The non-volatile memory 214 is a non-volatile storage medium and may store an operating system (OS) and an application program to be used by the CPU 211 and device information (a part of Info management information) which is not to be rewritten.

The user interface 215 displays various kinds of information to a user and may receive various instructions from a user.

The wireless communication unit 220 receives power from the power transmission device 10 wirelessly and is configured to transmit and receive data to and from the power transmission device 10. The wireless communication unit 220 includes an antenna 221, an RF circuit 222, a baseband unit 223, a power reception coil 224, a rectifying circuit 225, and a voltage stabilizing circuit 226.

The antenna 221 receives electromagnetic waves and converts them to an electric signal or converts an electric signal to electromagnetic waves.

The RF circuit 222 modulates a baseband signal in a frequency band (RF band) before transmitting it. The RF circuit 222 demodulates a signal in a frequency band to a baseband signal in receiving it.

The baseband unit 223 performs AD conversion on a signal demodulated in the RF circuit 222 and transmits it to the CPU 211. The baseband unit 223 performs DA conversion on an electric signal from the CPU 211 and transmits it to the RF circuit 222.

The power reception coil 224 receives a modulated signal from the power transmission device 10.

The rectifying circuit 225 rectifies power received from the power reception coil 224 and generates direct current voltage.

The voltage stabilizing circuit 226 stabilizes direct current voltage generated by the rectifying circuit 225 and feeds it to the battery 230.

The battery 230 receives the voltage stabilized by the voltage stabilizing circuit 226 and stores power. The battery 230 directs current voltage based on the stored power to the control unit 210 and wireless communication unit 220.

The CPU 211 executes a process based on a program stored in the ROM 212 or non-volatile memory 214 to implement a function of the power reception device.

Figure 4A:
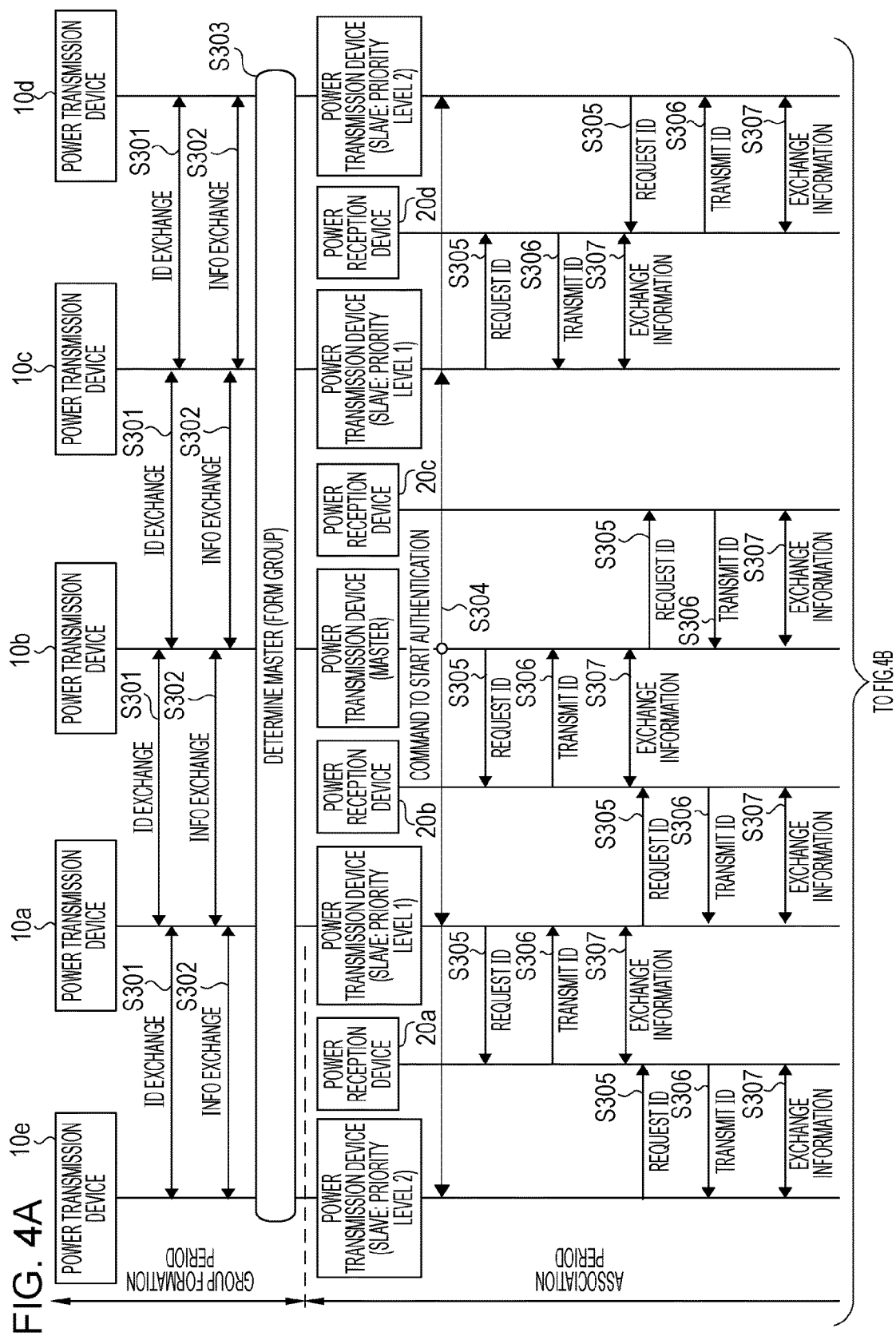
FIGS. 4A and 4B illustrate a sequence diagram illustrating an example of information processing in an N-to-N wireless power feeding system.
Figure 4B:
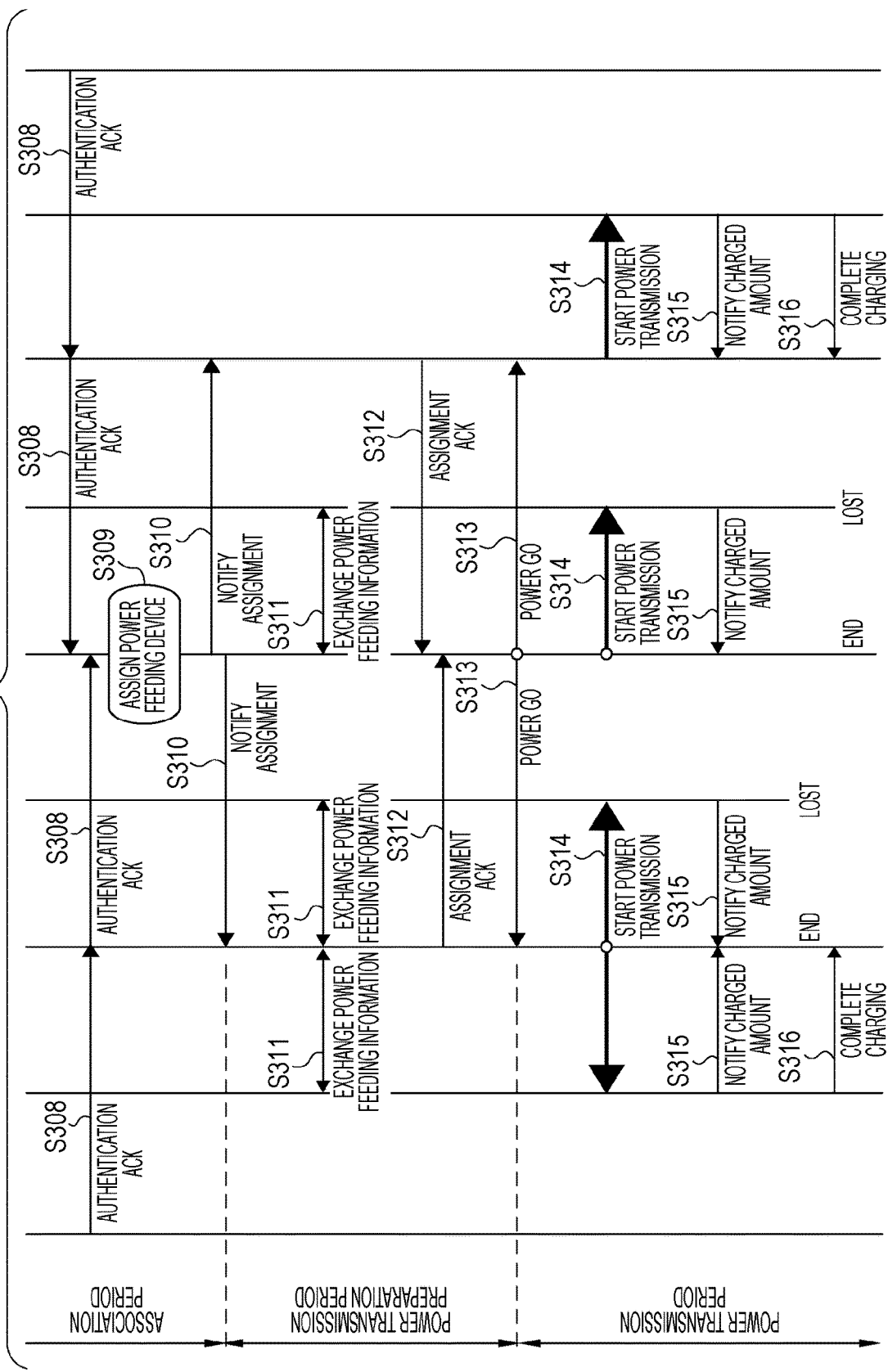

FIGS. 4A and 4B illustrate a sequence diagram illustrating an example of information processing in an N-to-N wireless power feeding system.

Figure 5:
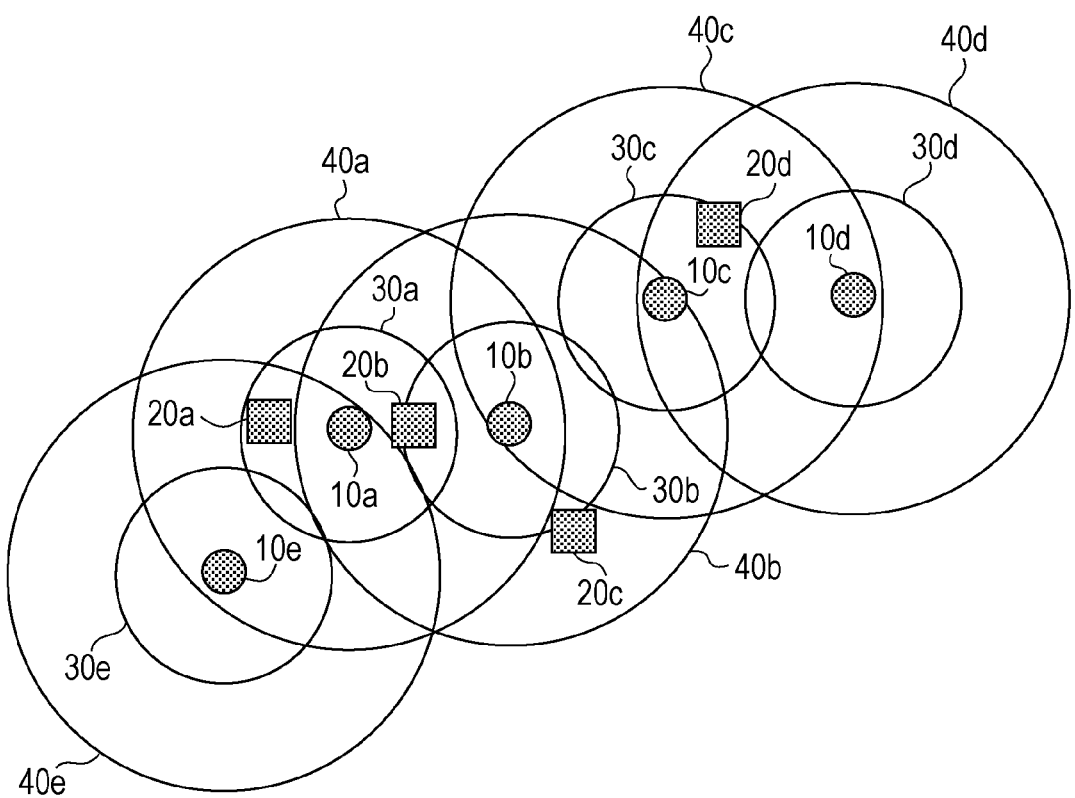
FIG. 5 illustrates an example of a system configuration of a wireless power feeding system.

FIGS. 4A and 4B illustrate a configuration of a wireless power feeding system illustrated in FIG. 5, for example. FIG. 5 illustrates the power transmission devices 10a to 10e having the following states.

The power transmission device 10a is communicable with the power transmission devices 10b and 10e and is capable of feeding power to the power reception devices 20a and 20b.

The power transmission device 10b is communicable with the power transmission devices 10a and 10c and is capable of feeding power to the power reception devices 20b and 20c.

The power transmission device 10c is communicable with the power transmission devices 10b and 10d and is capable of feeding power to the power reception device 20d.

The power transmission device 10d is communicable with the power transmission device 10c and does not feed power to any power reception device.

The power transmission device 10e is communicable with the power transmission device 10a and does not feed power to any power reception device.

The wireless power feeding system executes the following sequence to implement data communication for wireless power feeding in which a plurality of power transmission devices transmit power to a plurality of power reception devices.

First in S301, device ID information is exchanged between power transmission devices. Because device ID information is exchanged between power transmission devices which are communicable with each other, the power transmission device 10a exchanges device ID information with the power transmission device 10b and power transmission device 10e. Because the power transmission device 10b is also communicable with another power transmission device 10c, the power transmission device 10b also exchanges device ID information with the power transmission device 10c. Also, the power transmission device 10c exchanges device ID information with the power transmission device 10b and power transmission device 10d. Because the power transmission device 10d is only communicable with the power transmission device 10c, the power transmission device 10d exchanges device ID information with the power transmission device 10c. Also, the power transmission device 10e exchanges device ID information with the power transmission device 10a.

Next in S302, Info information is exchanged between power transmission devices. This Info information exchange is also performed between power transmission devices in mutual communicable areas, similarly to the device ID information exchange in S301, and information including a power feeding area, a communication area, the number of communicable power transmission devices and a maximum transmission power is exchanged.

In S303, the information exchanged in S301 and 302 is used to determine a power transmission device to operate as a master and form a group of a plurality of power transmission devices. According to this embodiment, a power transmission device which can communicate with all of the power transmission devices 10a to 10e through a lowest number of power transmission devices is determined as a master.

For example, when the power transmission device 10a is determined as a master, the power transmission device 10b may be required for communication with the power transmission device 10c, and the power transmission device 10b and power transmission device 10c may be required for communication with the power transmission device 10d. Because the power transmission device 10a is capable of direct communication with the power transmission device 10e and power transmission device 10c, no power transmission device may be required between the power transmission device 10a and the power transmission device 10e and power transmission device 10c. Therefore, three power transmission devices may be required between the power transmission device 10a and all of the other power transmission devices (two power transmission devices for communication with the power transmission device 10b and one for communication with the power transmission device 10c).

When the power transmission device 10b is determined as a master, the power transmission device 10a may be required for communication with the power transmission device 10e, and the power transmission device 10c may be required for communication with the power transmission device 10d. Because the power transmission device 10b is capable of direct communication with the power transmission device 10a and power transmission device 10c, no power transmission device may be required between the power transmission device 10b and the power transmission device 10a and power transmission device 10c. Two power transmission devices may be required (one for communication with the power transmission device 10a and one for communication with the power transmission device 10c).

When the power transmission device 10c is determined as a master, three power transmission devices may be required therebetween (one for communication with the power transmission device 10a, and two for communication with the power transmission device 10b).

Similarly, when the power transmission device 10d is determined as a master, six power transmission devices may be required therebetween (one for communication with the power transmission device 10a, two for communication with the power transmission device 10b, and three for communication with the power transmission device 10c).

When the power transmission device 10e is determined as a master, six power transmission devices may be required therebetween (three for communication with the power transmission device 10a, two for communication with the power transmission device 10b, and one for communication with the power transmission device 10c).

As a result of this, according to this embodiment, the power transmission device 10b which can communicate through a lowest number of power transmission devices is determined as a master, and the other power transmission devices are determined as slaves.

In S303, priority levels for candidates to be a master power transmission device are set for the slave power transmission devices. The priority levels are used for selecting a master power transmission device from slave power transmission devices within the group without exchanging Info information when a master power transmission device is not communicable.

According to this embodiment, because a power transmission device which can communicate through a lowest number of power transmission devices is determined as a master, a value of 1 (high priority level) is set as the priority levels of the power transmission devices 10a and 10c and a value of 2 (low priority level) is set as priority levels of the power transmission devices 10d and 10e. Here, priority levels are set such that a master power transmission device may exist in each group which is divided into a plurality of sub-groups when the master power transmission device 10b disappears.

Through these operations, the formation of a group of a plurality of power transmission devices completes. After that, in and after S304, power transmission devices and power reception devices are associated.

The association between power transmission devices and power reception devices includes the following two steps. A first step is an authentication operation for determining whether a power reception device exists within a communication area of each of the power transmission devices 10a to 10c or not. A second step is an assignment operation in which the master power transmission device 10b notifies assignment of power reception devices based on a result of the authentication operation on the power transmission devices.

These steps will be described in detail below.

In S304, the master power transmission device 10b issues a command to start authentication to slave power transmission devices. The authentication operation between power transmission devices and power reception devices is performed in S305 to S307. In S305, each power transmission device broadcasts a device ID request to check whether any power reception device exists within its communication area. According to this embodiment, the power reception device 20b and power reception device 20c within the communication area of the master power transmission device 10b receive the request from the power transmission device 10b. The power reception devices 20a and 20b within the communication area of the slave power transmission device 10a receives the request from the slave power transmission device 10a. The power reception device 20d within the communication area of the slave power transmission device 10c receives the request from the slave power transmission device 10c. The power reception device 20d within the communication area of the slave power transmission device 10d receives the request from the slave power transmission device 10d. The power reception device 20a within the communication area of the slave power transmission device 10e receives the request from the slave power transmission device 10e.

In S306, each of the power reception devices transmits its device ID information to the power transmission device from which the request has been received. According to this embodiment, the power reception device 20a transmits its device ID to the power transmission devices 10a and 10e. The power reception device 20b transmits its device ID to the power transmission devices 10a and 10b. Similarly, the power reception device 20c transmits its device ID to the power transmission device 10b. The power reception device 20d transmits its device ID to the power transmission devices 10c and 10d.

In S307, each of the power reception devices determines whether it is in the power transmission area of each of the power transmission devices and exchanges information on the determination result therebetween. According to this embodiment, the power transmission device 10a performs the information exchange with the power reception devices 20a and 20b. The power transmission device 10b performs the information exchange with the power reception devices 20b and 20c. The power transmission device 10c performs the information exchange with the power reception device 20d. Similarly, the power transmission device 10d performs the information exchange with the power reception device 20d. The power transmission device 10e performs the information exchange with the power reception device 20a.

Each of the power reception devices may determine whether it is within a power transmission area or not from a result of power transmission training from the power transmission device to the power reception device or based on a detection result from the position sensor.

In S308, when the slave power transmission devices finish the information exchange with the power reception device present in their communication areas, the slave power transmission devices notify the fact that the information exchange has finished and its result as an authentication Ack to the master power transmission device 10b and ends the authentication operation.

In S309, the master power transmission device 10b executes an assignment determining which power transmission device is to transmit power to which power reception device based on the authentication result between a power reception device with which the master power transmission device 10b is capable of communicating and a power reception device with which a slave power transmission device is capable of communicating.

Here, the power reception device 20b is present within the power feeding areas of both of the power transmission devices 10a and 10b, but this embodiment is configured such that a power reception device may receive power fed from the power transmission device 10*a* which is determined as being closer in distance and contributing to high power feeding efficiency between the power reception device and the power transmission device.

Because the power reception device 20*a* is present within the communication area but not within the power feeding area of the power transmission device 10*e*, the power reception device 20*a* receives power feeding from the power transmission device 10*a*. Similarly, because the power reception device 20*d* is present within the communication area but not within the power feeding area of the power transmission device 10*d*, the power reception device 20*d* receives power fed from the power transmission device 10*c*.

The association period ends here.

After the association period ends, a power transmission preparation period starts. In the power transmission preparation period, settings are defined for performing power transmission between power transmission devices and power reception devices based on the assignment determined between the power transmission devices. For example, a device ID of a power feeding destination, a source ID of a power feeding source, a power feeding frequency, and a remaining amount of power information of a power reception device may be defined. Operations to be performed in the power transmission preparation period will be described below.

In S310, the master power transmission device 10*b* executes an assignment notification which notifies a device ID of a power reception device to which power is transmitted to the slave power transmission devices 10*a* and 10*c*. Because the slave power transmission devices 10*d* and 10*e* do not execute power transmission to any power reception device, the master power transmission device 10*b* does not execute the assignment notification to the slave power transmission devices 10*d* and 10*e*.

In S311, the slave power transmission devices 10*a* and 10*c* exchange information for power feeding (which will be called power feeding information) with the power reception device instructed by the master power transmission device 10*b*.

When the exchange of power feeding information ends, the slave power transmission devices in S312 reply an assignment ACK which indicates that the power transmission preparation for the assigned power reception device ready. The power transmission preparation period ends when all of the slave power transmission devices 10*a* and 10*c* reply the assignment ACK to the master power transmission device 10*b*. A power transmission period starts in the next S313.

In S313, the master power transmission device 10*b* instructs the slave power transmission devices 10*a* and 10*c* to start power feeding to power reception devices.

In S314, wireless power feeding starts from the power transmission devices 10*a* to 10*c* to the power reception devices 20*a* to 20*d*.

In the power transmission period, the power reception devices 20*a* to 20*d* which are receiving power notify their charged amounts periodically in S315.

Then, in S316, a fully charged power reception device of the power reception devices 20*a* and 20*d* notifies the completion of charge to the corresponding one of the power transmission devices 10*a* and 10*c*.

On the other hand, the power reception devices 20*b* and 20*c* have a disappearance state from the power feeding system because power shuts down before completion of charge or the devices move away from the corresponding communication areas, for example. In this case, the power transmission devices 10*a* and 10*b* terminate the power feeding because they no longer receive notifications of the charged amounts.

In this manner, when all power reception devices 20*a* to 20*d* are completely charged or when the necessity for power feeding is eliminated because the receiving devices disappear, the power transmission period ends, and the association period starts again.

Figure 6:
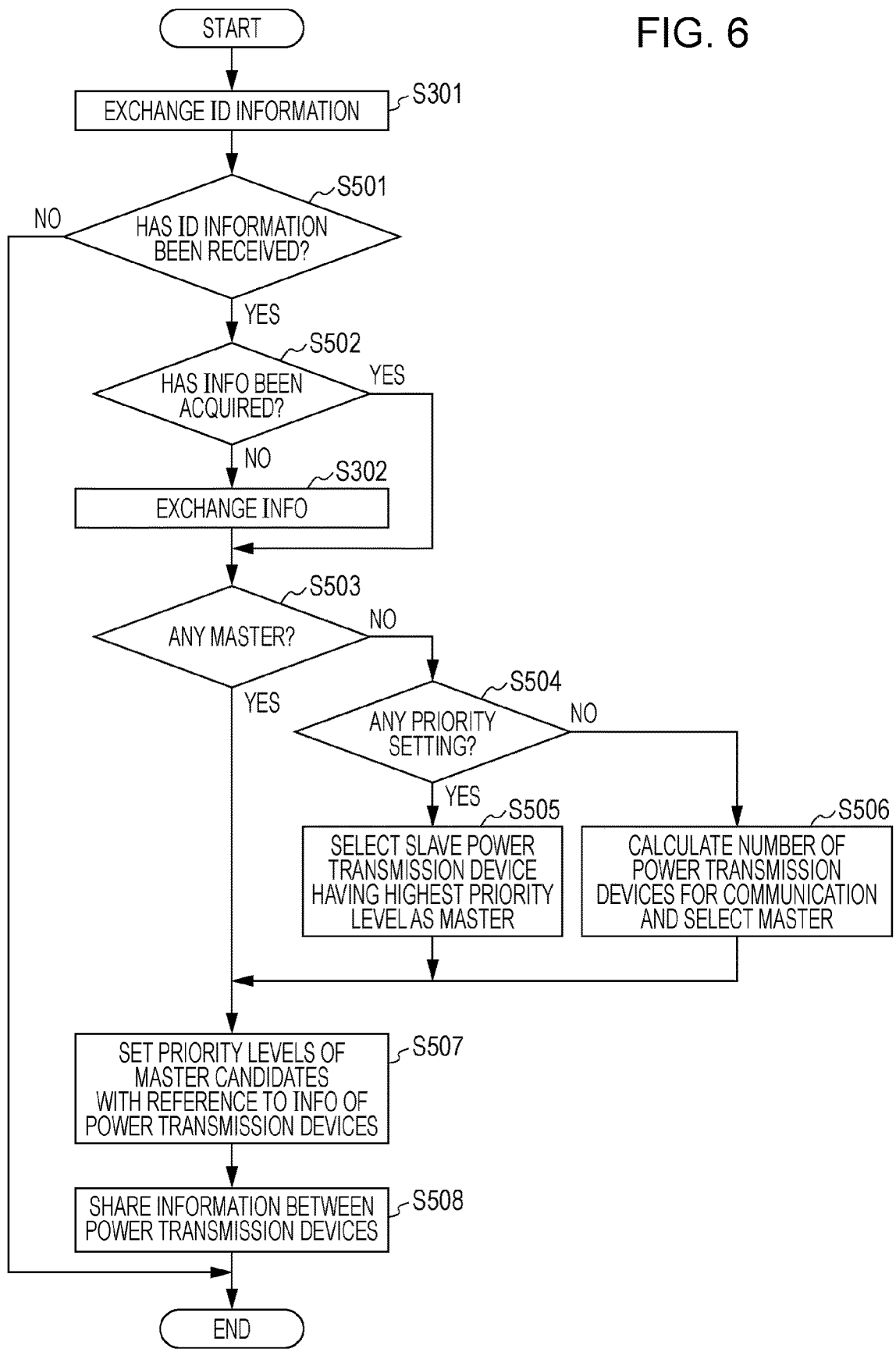
FIG. 6 is a flowchart illustrating an example of information processing to be performed by a group of transmitting devices in the sequence diagram of the wireless power feeding system in FIGS. 4A and 4B.

FIG. 6 is a flowchart illustrating an example of information processing in a transmission device before the group formation on the sequence diagram of the wireless power feeding system in FIGS. 4A and 4B.

A power transmission device first enters a group formation period for forming a group of a plurality of power transmission devices. In S301 in the group formation period, ID information exchange is performed between power transmission devices. In S501, the CPU 111 determines whether any ID information exchange with another power transmission device has been performed or not. If another power transmission device exists within a communication area, it means that the power transmission device also performs the ID information exchange with surrounding power transmission devices. Therefore, in S501, the CPU 111 may determine the presence/absence of a transmitting device within a communication area based on whether ID information of another power transmission device has been received or not.

If ID information has not been received in S501, the CPU 111 determines that no surrounding power transmission device exists for forming a group and ends the operation for forming a group.

If ID information has been received in S501, the CPU 111 in S502 determines whether the Info of the power transmission device from which ID information has been received has been acquired or not. If it is determined in S502 that Info information has not been acquired, the CPU 111 in S302 exchanges Info information.

If it is determined in S502 that Info information of the power transmission device with which ID information has been exchanged has already been acquired, the CPU 111 moves to operations for determining a master and forming a group in S303, without performing the Info exchange in S302.

The operations for determining a master and forming a group in S303 are performed in the following order in FIG. 6.

First, the CPU 111 determines whether the master power transmission device exists in the power transmission devices which have performed ID information exchange in S301 or not in S503. If a power transmission device operating as a master exists, the CPU 111 continuously defines the power transmission device as a master power transmission device.

If a power transmission device operating as a master does not exist, the CPU 111 in S504 determines whether priority levels for master power transmission device candidates have been set for the power transmission devices which have exchanged ID information.

If priority levels have been set for power transmission devices, the CPU 111 in S505 selects a power transmission device having a highest priority level among the power transmission devices as a master power transmission device (re-determination).

If priority levels have not been set for power transmission devices in S504, the CPU 111 in S506 selects a master power transmission device. As described above, in FIGS. 4A and 4B and S506, the CPU 111 selects as a master power transmission device a power transmission device which can communicate with all power transmission devices included in a group through a lowest number of power transmission devices.

In S506, any of other various power transmission devices may be selected as a master power transmission device, such as a power transmission device which can feed a largest amount of power, which may directly communicate with a highest number of power transmission devices, which contains the CPU 111 having a highest processing capability, or which has a largest communication area, for example.

After a master power transmission device is determined by the operation, the CPU 111 in S507 sets priority levels of master candidates for the other power transmission devices than the master power transmission device. The priority levels for master candidates may be set in the same manner as in S506.

In S508, the CPU 111 causes the information on the master power transmission device selected in S503 to S506 and information on the priority levels for master candidates determined in S507, for example, to be shared between the power transmission device.

After this operation, the determination of a master transmitting device and formation of a group end.

Figure 7:
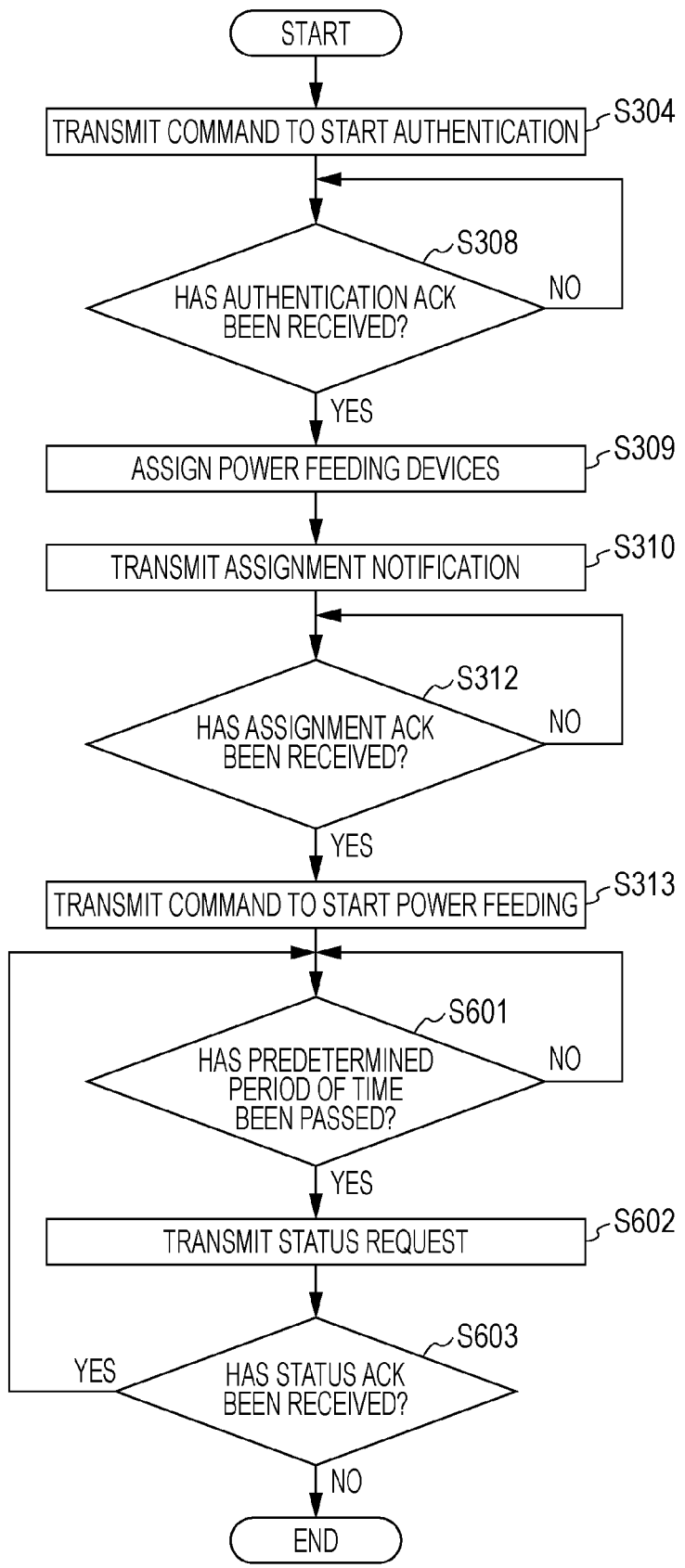
FIG. 7 is a flowchart illustrating an example of information processing to be performed by a master power transmission device which has been determined.

FIG. 7 is a flowchart illustrating an example of information processing to be performed by the master power transmission device determined in S303. It should be noted that FIG. 7 illustrates a flow of communication operations between the master power transmission device and a slave power transmission device. With reference to FIG. 7, there will be described operations to be performed by the master power transmission device in a case where a slave power transmission device within a group disappears.

When a master power transmission device is determined, the CPU 111 of the master power transmission device (hereinafter, simply called CPU 111 with reference to FIG. 7) in S304 issues an command to start authentication for performing the authentication operation with respect to power reception devices for slave power transmission devices within a group. If the slave power transmission device receives a command to start authentication, the slave power transmission device performs information exchange with the power reception devices and transmits an authentication Ack signal indicating that the authentication operation with respect to the power reception devices has finished.

In S308, the CPU 111 waits for reception of the authentication Ack signal from all slave power transmission devices in the group.

If the authentication Ack signal is received from all of the slave transmission devices, the CPU 111 in S309 assigns power feeding devices to transmit power to the power reception devices based on the authentication results from the slave power transmission devices.

In S310, the CPU 111 transmits, to the slave power transmission devices, details of the assignment determined in S309, as an assignment notification.

After that, in S312, the CPU 111 waits for reception of an assignment ACK indicating that power transmission preparation is ready with respect to the assigned power reception devices from all of the slave power transmission devices in the group.

If the assignment Ack signal is received from all of the slave transmission devices, the CPU 111 in S313 transmits the slave power transmission devices a command to start power feeding to the power reception devices. Thus, power transmission preparation period ends here, and a power transmission period starts where the power transmission devices start wireless power feeding to the power reception devices.

In the power transmission period, the CPU 111 waits for a lapse of a predetermined time in S601.

After the predetermined time has passed, the CPU 111 in S602 transmits to the slave power transmission devices in the group a Status request for acquiring statuses of the power transmission devices and statuses of power reception devices to which the slave power transmission devices are transmitting power.

In S603, the CPU 111 waits for reception of a Status Ack in response to the Status request transmitted in S602 from all of the slave power transmission devices in the group.

If the Status Ack signal is received from all of the slave transmission devices, the CPU 111 in S601 again waits for a lapse of a predetermined time. Thus, the master transmitting device outputs a Status request signal to the slave power transmission devices every predetermined time.

On the other hand, if there is some slave power transmission device from which the Status Ack has not been received in S603, the CPU 111 determines that the slave power transmission device has disappeared and finishes the power transmission period. After that, the power transmission device returns to S303 and forms a group of the remaining power transmission devices again.

Figure 8:
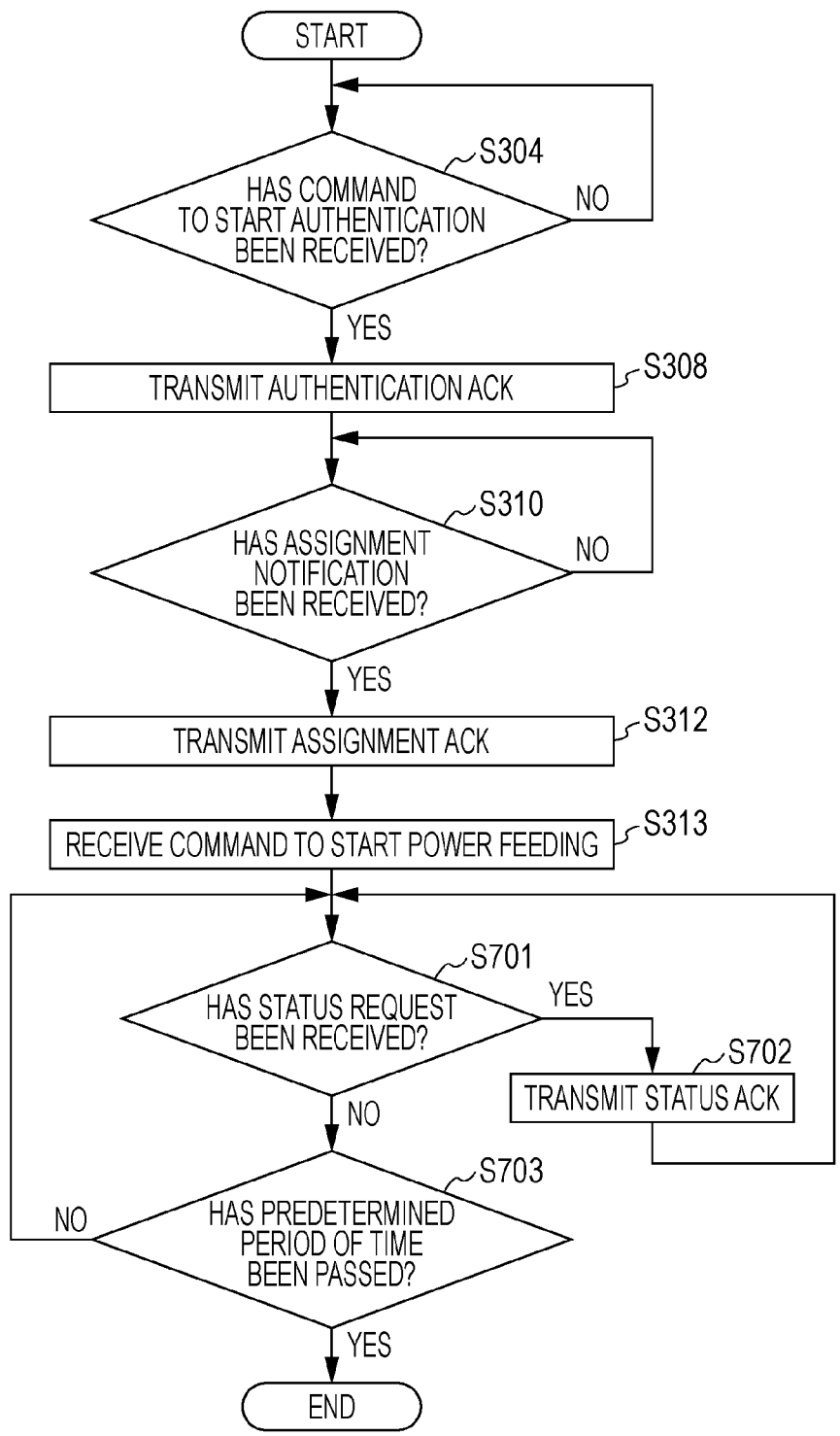
FIG. 8 is a flowchart illustrating an example of information processing of a slave power transmission device after a master power transmission device is determined.

FIG. 8 is a flowchart illustrating an example of information processing in a slave power transmission device after the master power transmission device has been determined in S303. It should be noted that FIG. 8 illustrates communication operations between the master power transmission device and slave power transmission devices. With reference to FIG. 8, operations of a slave power transmission device will be described in a case where the master power transmission device within the group disappears.

When a master power transmission device is determined, a CPU 111 in the slave power transmission device (hereinafter, simply called CPU 111 with reference to FIG. 8) waits for reception of the command to start authentication from the master power transmission device in S304.

When the command to start authentication is received from the master power transmission device, the CPU 111 performs the authentication operation with respect to power reception devices and then in S308 transmits an authentication Ack signal indicating that the authentication operation has ended to the master power transmission device.

Thus, the association period ends, and a power transmission preparation period then starts.

In the power transmission preparation period, in S310, the CPU 111 waits for reception of the assignment notification signal from the master power transmission device to slave power transmission devices.

When the assignment notification signal is received from the master power transmission device, the CPU 111 prepares for power transmission to power reception devices in accordance with details of the assignment notification signal. When the power transmission preparation is ready, the CPU 111 in S312 transmits an assignment Ack signal to the master power transmission device.

After that, in S313, the CPU 111 receives a command to start power feeding from the master power transmission device. Then, the power transmission preparation period ends, and a power transmission period starts where wireless power feeding is started from the power transmission devices to the power reception devices.

In the power transmission period, in S701, the CPU 111 determines whether the Status request has been transmitted from the master power transmission device. If the Status request is received, the CPU 111 in S702 transmits the Status Ack to the master power transmission device. If the Status request is not received, the CPU 111 in S703 determines whether a predetermined time has been passed. If not, the CPU 111 returns to S701 and determines again whether the Status request has been received. On the other hand, if the Status request is not received within the predetermined time, the CPU 111 determines that some error, for example, may occur in the master power transmission device or that the slave power transmission device itself disappears from the group and is no longer capable of communicating with the master power transmission device and ends the power transmission period.

After that, the power transmission device returns to S301 where a group is formed again by performing the device ID exchange operation.

Figure 9:
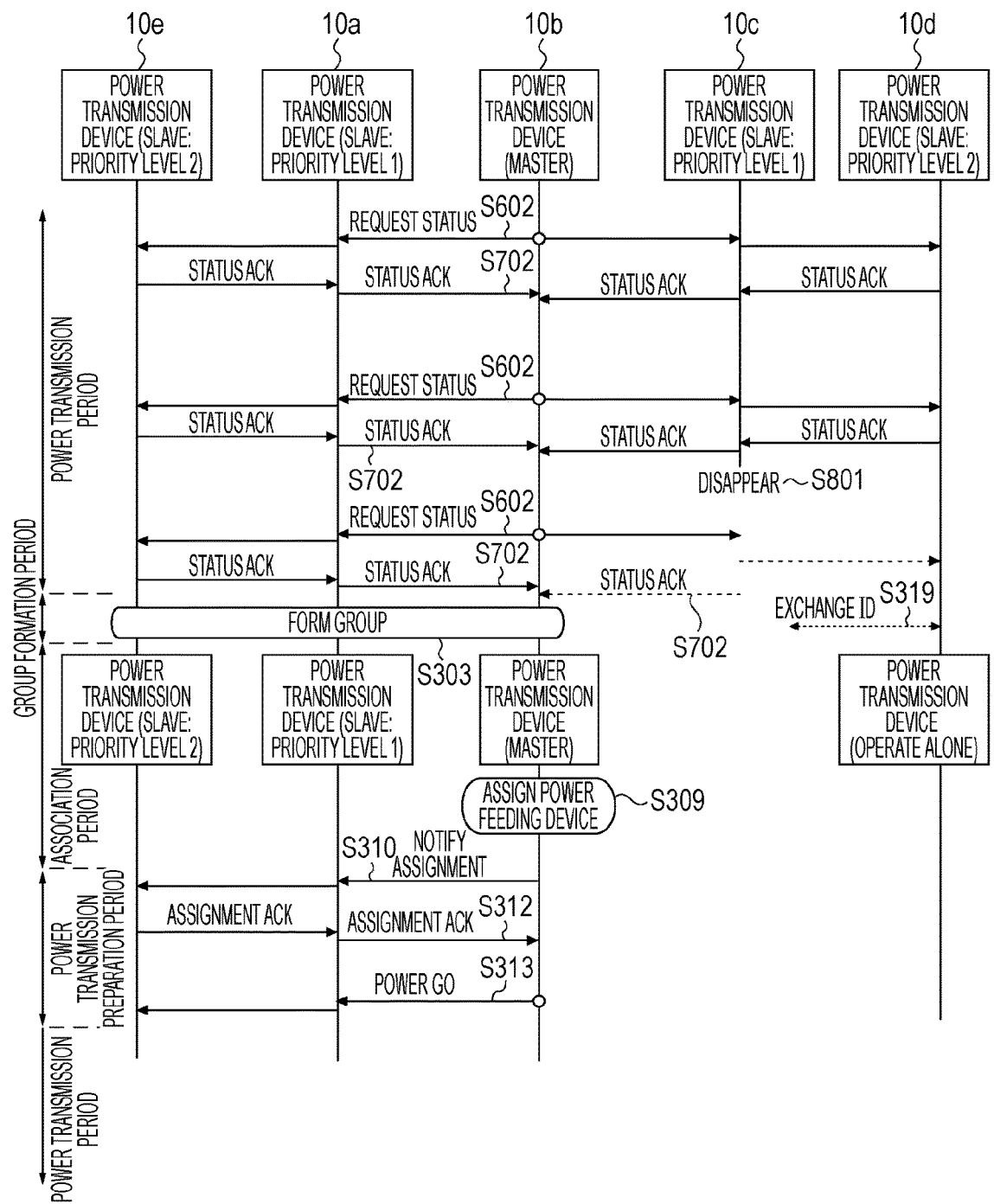
FIG. 9 is a sequence diagram illustrating data exchanges to be performed when a slave power transmission device disappears in the wireless power feeding system illustrated in FIGS. 4A and 4B.

FIG. 9 is a sequence diagram illustrating data exchanges in a case where the slave power transmission device 10c disappears in the wireless power feeding system illustrated in FIGS. 4A and 4B. When the slave power transmission device 10c disappears in S801, the Status Ack from the slave power transmission device 10d in S702 is not transmitted to the master power transmission device in response to the Status request from the master power transmission device 10b in S602.

Referring to FIG. 9, the slave power transmission device 10d communicates with the master power transmission device through the slave power transmission device 10c. Thus, because of the disappearance of the slave power transmission device 10c in S801, the slave power transmission device 10d is no longer capable of communicating with the master power transmission device. Therefore, the Status Ack of the slave power transmission device 10d is not replied to the master power transmission device synchronously with the slave power transmission device 10c.

After outputting the Status request, if there is some slave transmission device which does not reply the Status Ack within a predetermined period of time, the master power transmission device shifts from the power transmission period to the group formation period. Then in S303, the master power transmission device forms again a group of slave transmission devices which have replied the Status Ack. In FIG. 9, because the Status Ack is received from the slave power transmission devices 10a and 10e, the master power transmission device 10b forms a group including the slave power transmission devices 10a and 10e. Then, the master power transmission device 10b sets priority levels of master power transmission device candidates for the slave transmission devices within the newly formed group.

In FIG. 9, the master power transmission device 10b sets a priority level 2 to the slave power transmission device 10e and a priority level 1 to the slave power transmission device 10a.

After that, in S309, the master power transmission device 10b assigns the power transmission devices within the group to transmit power to the power reception devices, and the association period ends.

After the association period ends, a power transmission preparation period starts. In the power transmission preparation period, when the assignment of power transmission devices to transmit power is changed, setting for power transmission are defined in S309 between power transmission devices and power reception devices based the changed assignment.

In S310, the master power transmission device executes an assignment notification which notifies the slave power transmission devices of the device IDs for executing the power transmission.

After that, the slave power transmission devices exchange information for power feeding with a power reception device instructed by the master power transmission device.

After the exchange of power feeding information with the power reception device finishes, the slave power transmission device in S312 replies to the master power transmission device an assignment ACK indicating that the power transmission preparation for the assigned power reception device is ready. At the time when the assignment ACK is replied from all slave power transmission devices within a group to the master power transmission device, the power transmission preparation period ends. A power transmission period starts from the next S313.

A slave power transmission device whose assignment does not change before and after the group re-formation in S309 does not reply to the assignment notification from the master transmission device in S310 and does not reply to the assignment Ack signal from the slave transmission device in S312.

After that, the master power transmission device in S313 instructs the slave power transmission device to start power feeding to the power reception device. Thus, wireless power feeding from the power transmission devices to the power reception devices is started again.

Figure 10:
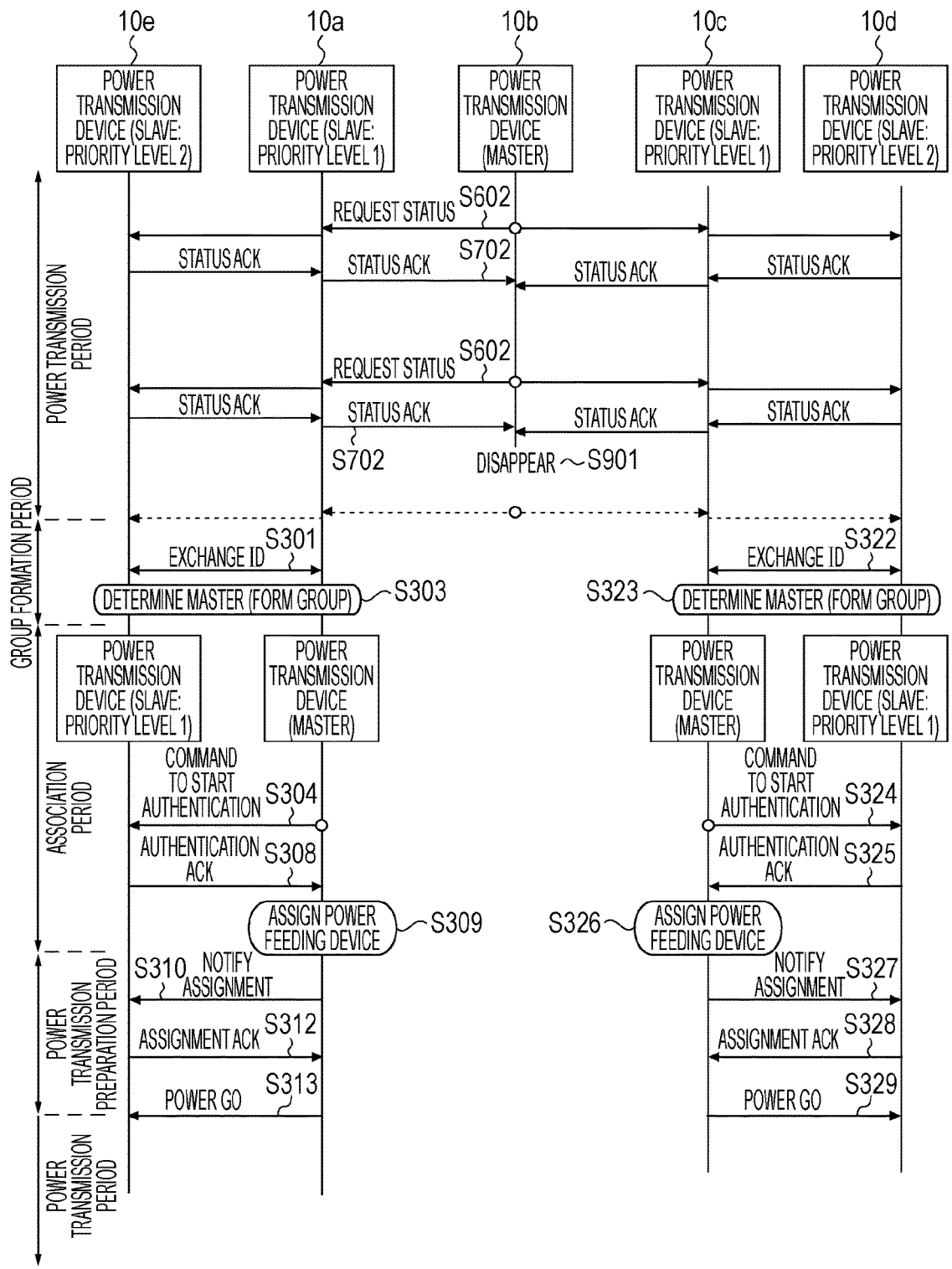
FIG. 10 is a sequence diagram illustrating data exchanges to be performed when a master power transmission device disappears in the wireless power feeding system in FIGS. 4A and 4B.

FIG. 10 is a sequence diagram illustrating data exchanges when the master power transmission device 10b disappears in the wireless power feeding system illustrated in FIGS. 4A and 4B.

In S901, the master power transmission device 10b disappears.

Then, in S602, the Status request is no longer transmitted from the master power transmission device to the slave power transmission devices.

When the Status request is not transmitted from the master power transmission device in S602, each of the slave power transmission devices in the group determines that some error may occur in the master power transmission device, for example, or that the slave transmission device itself is separated from the group. After that, in S301, the slave power transmission devices shift to a group formation period, and each of the slave power transmission devices exchanges device ID information with another power transmission device within a communicable range for forming a new group.

Then, a group of power transmission devices which have exchanged device ID information in S301 is formed. Referring to FIG. 10, the power transmission devices 10a and 10e exchange device ID information. Therefore, a group of the two power transmission devices is formed. On the other hand, the exchange of device ID information is also performed between the power transmission devices 10c and 10d. Therefore, a group of the two power transmission devices is formed.

The group of the power transmission devices 10a and 10e, for example, will be described below.

In S303, the power transmission devices 10a and 10e select a master power transmission device in the formed group. The values of priority levels for master power transmission device candidates assigned to the slave transmission devices are used. In other words, the values of priority levels are compared between the power transmission devices. A power transmission device having the highest priority level (or the lowest value of the priority levels) within the group is determined as a master power transmission device.

Referring to FIG. 10, the power transmission device 10a has a priority level of 1, and the power transmission device 10e has a priority level of 2. Therefore, the power transmission device 10a is determined as a master, and the power transmission device 10e is determined as a slave. Though values of priority levels are to be assigned to slave power transmission devices within a newly formed group in S303, one slave power transmission device may exist within the formed group. Therefore, a highest priority level of 1 is assigned to the power transmission device 10a.

In S304, the master power transmission device issues a command to start authentication for performing the authentication operation on a power reception device for the slave power transmission device. The slave power transmission device in response to the command to start authentication performs an authentication operation on a power reception device. After issuing a command to start authentication to a slave power transmission device, the master power transmission device itself performs the authentication operation on a power reception device.

In S308, when the information exchange with a power reception device present within its communication area finishes, the slave power transmission device notifies the master power transmission device that the information exchange has finished and a result of the information exchange. Then, the authentication operation ends.

In S309, the master power transmission device determines the assignment of which power transmission device transmits power to which power reception device based on the authentication result of the slave power transmission device.

The association period ends here.

After the association period ends, the power transmission preparation period starts. In the power transmission preparation period, in S309, settings are defined for performing power transmission between power transmission devices and power reception devices based on the determined assignment. For example, a device ID of a power feeding destination, a source ID of a power feeding source, a power feeding frequency, and a remaining amount of power information of a power reception device may be defined.

In S310, the master power transmission device 10b executes an assignment notification which notifies a device ID of a power reception device to which power is transmitted to the slave power transmission devices.

In S312, the slave power transmission device replies an assignment ACK which indicates that the power transmission preparation for the assigned power reception device ends. The power transmission preparation period ends when all of the slave power transmission devices have replied the assignment ACK to the master power transmission device. A power transmission period starts.

Having described the formation of a group of the power transmission devices 10a and 10e after the master power transmission device 10b disappears, the same operations in S323 to S329 are performed on a group of the power transmission devices 10c and 10d. In the group of the power transmission devices 10c and 10d, because the power transmission device 10c has a value 1 of priority level and the power transmission device 10d has a value 2 of priority level as master power transmission device candidates, the power transmission device 10c is determined as a master power transmission device, and the power transmission device 10d is determined as a slave power transmission device. The power transmission device 10d has a priority level value of 1 which is the highest because no other slave power transmission devices are contained in the group.

Figure 11:
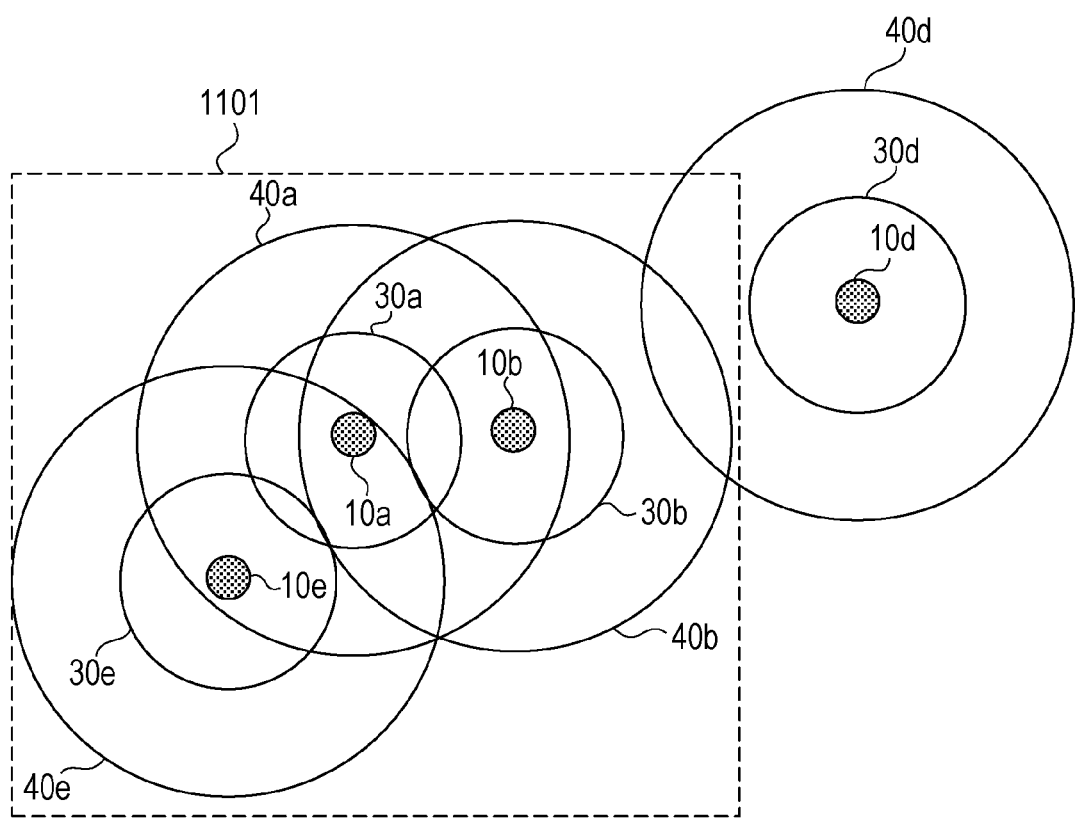
FIG. 11 illustrates an example of a state in which the slave power transmission device disappears in FIG. 9 in the configuration of the wireless power feeding system illustrated in FIG. 5.

FIG. 11 illustrates an example of a state in which the slave power transmission device 10c disappears in S801 in FIG. 9 in the configuration of the wireless power feeding system illustrated in FIG. 5. The power reception devices 20 are omitted in FIG. 11. In FIG. 11, a broken line 1101 a group of the power transmission device 10a and power transmission device 10e which are capable of communicating with the master power transmission device 10b.

Figure 12:
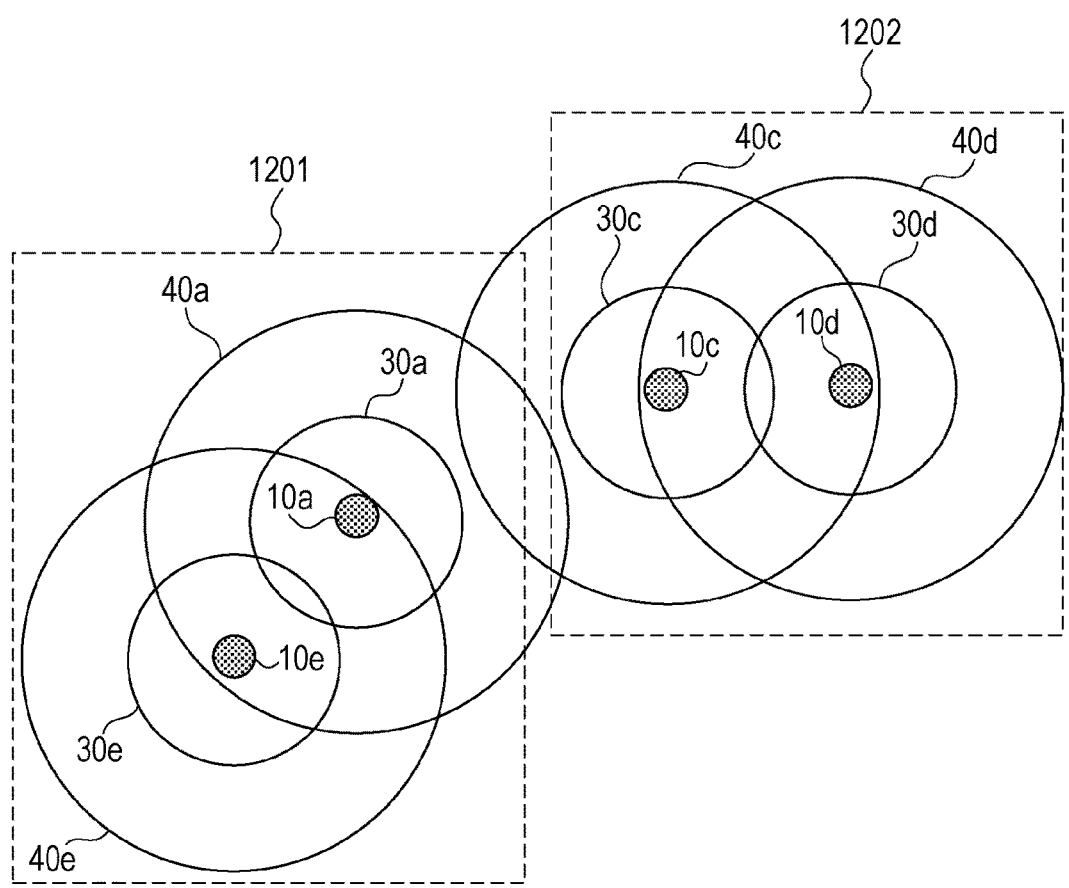
FIG. 12 illustrates an example of a state in which the master power transmission device disappears in FIG. 10 in the configuration of the wireless power feeding system illustrated in FIG. 5.

FIG. 12 illustrates an example of a state in which the master power transmission device 10b disappears in S901 in FIG. 10 in the configuration of the wireless power feeding system illustrated in FIG. 5. In FIG. 12, power reception devices 20 are omitted, like FIG. 11. In FIG. 12, a broken line 1201 represents a group of the power transmission device 10a and power transmission device 10e which are communicable, and a broken line 1202 represents a group of the power transmission device 10c and power transmission device 10d which are communicable. It should be noted that the power transmission devices 10a and 10e operate as a master and a slave, respectively, in the group represented by the broken line 1201. The power transmission devices 10c and 10d operate as a master and a slave, respectively in the group represented by the broken line 1202.

As described above, according to this embodiment, information is shared between power transmission devices included in a group, and priority levels of the power transmission devices for selecting the next master power transmission device in a case when a current master power transmission device disappears. Thus, when a power transmission device in a group disappears due to a failure, for example, a new group may be formed in a short period of time. Therefore, the time for returning to power feeding to receiving devices may be reduced after the power transmission device fails.

Other Embodiments

The present invention may be implemented by processing in which a program which implements one or more functions of the aforementioned embodiment is fed to a system or apparatus over a network or through a storage medium and one or more processors in a computer of the system or apparatus reads out and executes the program. The present invention may be implemented by a circuit (such as an ASIC) which may implement the one or more functions.

According to the aforementioned embodiments, a new power feeding system may be constructed in a short period of time.

Having described embodiments of the present invention in detail, the present invention is not limited to specific embodiments. Various modifications and changes may be made without departing the spirit and scope of the claimed present invention patent.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-005423, filed Jan. 15, 2014, which is hereby incorporated by reference herein in its entirety.

What is claimed is:

1. A device comprising:
a determining unit configured to determine whether a power transmission device having predetermined authority exists among a plurality of power transmission devices based on information acquired from the plurality of power transmission devices, wherein the predetermined authority is authority to determine to which power reception device each of the plurality of power transmission devices transmits power;
a selecting unit configured to select a power transmission device to which the predetermined authority is to be assigned among the plurality of power transmission devices, in a case where the determining unit determines that the power transmission device having the predetermined authority does not exist; and
a notifying unit configured to notify the plurality of power transmission devices of information of the selected power transmission device.

2. The device according to claim 1, wherein the selecting unit selects the power transmission device to which the predetermined authority is to be assigned, based on capability information of each of the plurality of power transmission devices.

3. The device according to claim 2, wherein the capability information indicates a maximum amount of power that a power transmission device is able to feed.

4. The device according to claim 2, wherein the capability information indicates a processing capability of a CPU of a power transmission device.

5. The device according to claim 2, wherein the capability information indicates a size of a communication area of a power transmission device.

6. The device according to claim 1, wherein the selecting unit selects the power transmission device to which the predetermined authority is to be assigned, based on priority set in advance.

* * * * *